April 8, 1952 J. ERWOOD 2,591,796

INTERMITTENT OPERATING MECHANISM

Filed June 21, 1947 7 Sheets-Sheet 1

Inventor
Joseph Erwood
By Spencer, Marzall, Johnston & Cook Attys

April 8, 1952 J. ERWOOD 2,591,796

INTERMITTENT OPERATING MECHANISM

Filed June 21, 1947 7 Sheets-Sheet 2

Inventor
Joseph Erwood

By: Spencer, Marzall, Johnston & Cook
Attys

April 8, 1952 J. ERWOOD 2,591,796

INTERMITTENT OPERATING MECHANISM

Filed June 21, 1947 7 Sheets-Sheet 3

Inventor
Joseph Erwood

By: Spencer, Marzall, Johnston & Cook
Attys

April 8, 1952 J. ERWOOD 2,591,796

INTERMITTENT OPERATING MECHANISM

Filed June 21, 1947 7 Sheets-Sheet 4

Inventor
Joseph Erwood

By: - Spencer, Marzall, Johnston & Cook
Atty

April 8, 1952 J. ERWOOD 2,591,796

INTERMITTENT OPERATING MECHANISM

Filed June 21, 1947 7 Sheets-Sheet 5

Inventor
Joseph Erwood

By: Spencer, Marzall, Johnston & Cook
Attys

April 8, 1952 J. ERWOOD 2,591,796

INTERMITTENT OPERATING MECHANISM

Filed June 21, 1947 7 Sheets-Sheet 6

Inventor
Joseph Erwood
By: Spencer, Marzall, Johnston & Cook Attys.

April 8, 1952 J. ERWOOD 2,591,796

INTERMITTENT OPERATING MECHANISM

Filed June 21, 1947 7 Sheets-Sheet 7

Inventor
Joseph Erwood
By: Spencer, Marzall, Johnston & Cook Attys.

Patented Apr. 8, 1952

2,591,796

UNITED STATES PATENT OFFICE 2,591,796

INTERMITTENT OPERATING MECHANISM

Joseph Erwood, Crystal Lake, Ill., assignor, by mesne assignments, to William J. McGah, as trustee Application June 21, 1947, Serial No. 756,273

2 Claims. (Cl. 274—10)

The present invention relates generally to intermittently operable apparatus, and has more particular reference to mechanism for delivering or feeding phonograph records successively into operating position in record playing equipment.

Feed mechanism of the character mentioned may comprise automatic record feeding apparatus, in combination with record playing mechanism, including means for delivering record members or discs successively from a stack or magazine to a motor driven disc turntable, and mechanism for accomplishing related control operations, including the application and withdrawal of a sound pick-up device to and from a record disc on the turntable, in timed relation with the operation of the record disc feeding apparatus, whereby to permit a series of record discs to be played successively, in automatic fashion, on the turntable.

An important object of the present invention is to provide improved and simplified feeding apparatus having a minimum number of operating parts, requiring minimum care and adjustment, affording improved operating performance, and adapted for manufacture at low cost.

Another important object is to provide apparatus of the character mentioned adapted normally to be retained in cocked, yet inactive, condition, thus eliminating operational noise, while inactive, the mechanism being rendered active, at the conclusion of the operating cycle of associated operating mechanism, whereby to deliver an object to be fed to such associated mechanism, and to perform related control operations, and then to return to inactive cocked position; a further object being to provide means operable for releasing the feed mechanism for operation at any time during the performance of the operating cycle of the associated apparatus.

Another important object is to provide simplified driving mechanism intermittently operable for delivering records, in succession as from a stack or magazine, to playing position, as on a record support or turntable of associated record playing mechanism, including mechanism for raising, lowering and swinging the sound pick-up device of the record playing mechanism as a part of the record feeding cycle; a further object being to actuate the pick-up device by means of a cam operated in timed relation with the feeding mechanism, at intervals during its operating cycle; a still further object being to swingingly move the pick-up device by means of a friction wheel and driving segment operatively connected with the driving mechanism.

Another important object is to provide improved magazine means for supporting a plurality of record discs in position for successive delivery into playing position, as on the turntable of a record playing device; a still further object being to provide edge pushing mechanism of novel and simplified construction in position to shift the lowermost record, in a record stack, to release the same from the stack for delivery to the turntable; yet a further object of the invention being to provide novel and simplified edge pushing mechanism conditionable to cooperate with records of various sizes by the operation of an adjustable control member.

Another important object is to provide edge pushing mechanism including edge supporting means for supporting the edge of a record stack, wherein said edge supporting means is normally urged toward projected supporting position but may yield upwardly to facilitate removal of records, from an associated turntable, in an upward direction past said edge supporting means.

Another important object resides in providing edge pushing means, including an adjustable member or plate having a portion or portions adapted to underlie and support the edges of records forming a record stack, said member being adjustable in a direction radially of said stack whereby to position the same for the edge support of records of unlike size, including an edge pushing member on said plate and movable therewith as the same is adjusted radially of the record stack, and means to relatively shift the edge pushing member, with respect to the plate, regardless of the adjusted position of the latter; a further object being to utilize a simple lever mechanism for adjustably shifting said edge supporting and pushing members; a still further object being to utilize the movement of said lever mechanism to condition the associated record playing apparatus for operation in accordance with the size of record discs being played as determined by the adjusted position of the edge supporting and pushing members.

Another object is to provide adjustable means, in a record playing apparatus, including a stop positionable in any selected one of a number of controlled positions for determining the starting position of the pick-up device, of the record playing apparatus, at the start of a record playing operation, so that the apparatus may be adjusted to play records of various sizes; a further object being to provide for so determining the starting position of the pick-up device by engagement of a stop member, thereon, with a cooperating latch during the operating cycle of the record feeding mechanism.

Another object is to form the latch to receive the stop member in any selected one of a plurality of detents, on the latch and representing the various possible tone arm starting positions, the latch being cooperatively associated with adjustable means controlled, in accordance with the adjustment of the edge pushing mechanism, to select, for engagement with the stop, the latch detent corresponding with the record size for which the edge pushing mechanism shall have been adjusted.

Another important object is to provide improved tripping means for releasing the record feeding mechanism for operation whenever the pick-up device reaches the limit of its record playing movement, the tripping means being also operable at will, during the playing of a record, to reject the record being played by causing a succeeding record to be fed from the stack to playing position on the turntable.

Another important object is to provide simplified means for releasing the mechanism for the performance of its cycle of operation, automatically, as at the conclusion of the playing of a record on the turntable.

Another object is to provide for manually releasing the feeding mechanism for record rejecting purposes, as during the playing of an unwanted record.

Another important object is to provide for locking the mechanism in cocked, inoperative position, whereby the associated apparatus may be conditioned to function, as if not provided with automatic feeding mechanism.

Another important object is to actuate the mechanism by means of a driven cam; a further object being to provide for the driving of the cam by the turntable motor; a still further object being to connect the cam to the motor driven turntable to thereby drive the same; yet a further object being to form the cam as a generally helical groove in a cam member suitably journaled for turning movement in response to the operation of the turntable driving motor; a still further object being to form the cam groove on the sides of a generally spherical cam member mounted for turning movement about the axis of the helical groove.

Another object is to drive the operating mechanism by means of a pair of cam following clutches, preferably comprising pins, normally retained in retracted position, whereby the mechanism may normally remain inactive, in cocked condition, ready to perform its operating cycle, one of said pins being releasable to initiate the cycle of operation, and on release being adapted to engage the spiral cam whereby to move the operating mechanism in one direction to a projected position, said pin being released from the cam and latched in inoperative position when the mechanism reaches such projected position, and the other pin being then released for driving engagement with the cam to thereby return the mechanism to its inactive or stand-by position, in which position said other pin is released from the cam and relatched in inactive position so that the feeding mechanism, after performing its operating cycle, is returned to inactive stand-by position, in which it remains cocked and ready for a repeat performance.

Another important object is to employ the movement of the operating mechanism in one direction to lift and retract the pick-up device of the record player to a retracted or stand-by position clear of the record stack and turntable, then to actuate the record feeding mechanism, and to employ the movement of the operating mechanism, in the return direction, to swing and deposit the pick-up device, in playing position, on the changed record.

Another important object is to provide for the release of the operating mechanism, for the performance of its operating cycle, by a latch releasing cam, driven by the turntable motor, and a latch release member, normally held inactive so that the cam may not engage and actuate it, the release member being released for movement into the path of the cam, in response to movement of the sound pick-up device at the end of its record playing movement, or by operation of manual release means such as a reject control member, such normally inactive release member preventing accidental operation of the operating mechanism and insuring operation thereof only in a desired manner.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 2:
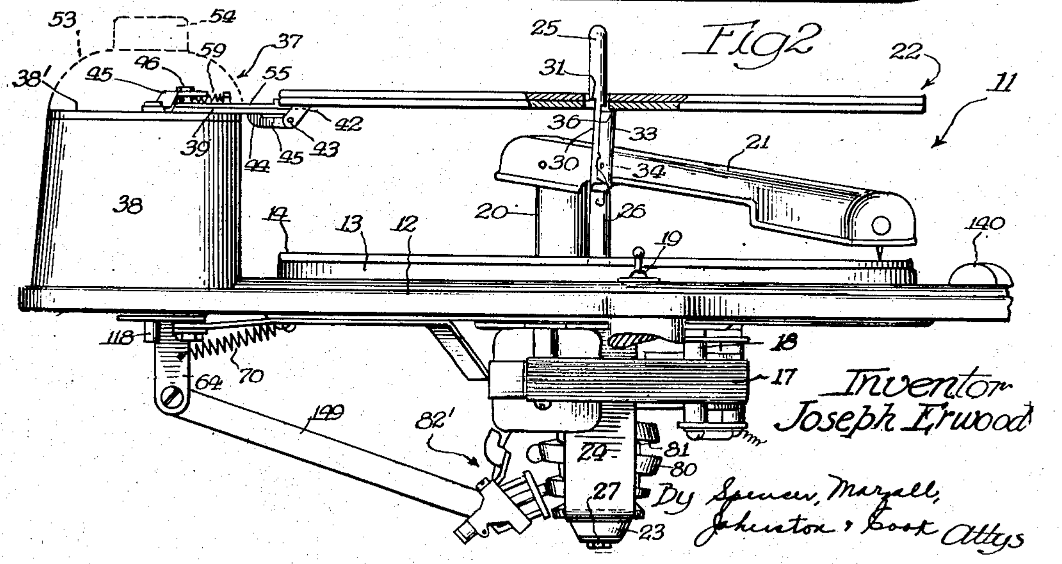
Figs. 2 and 3 are, respectively, a front and a side view of the apparatus shown in Fig. 1.
Figures 3, 4, 5:
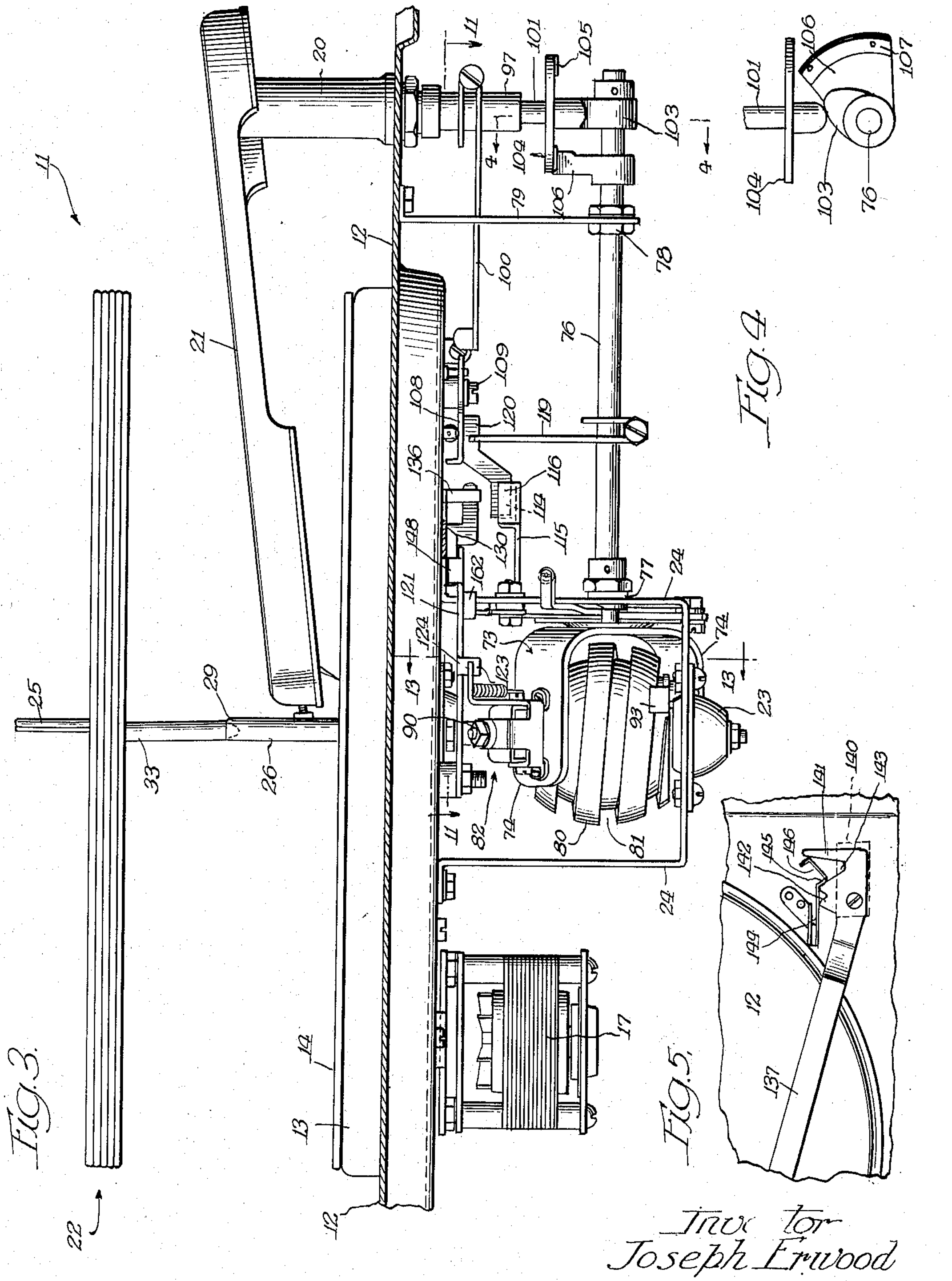

Figs. 4 and 5 are sectional views taken, respectively, along lines 4—4 and 5—5, in Figs. 3 and 2.

Figure 1:
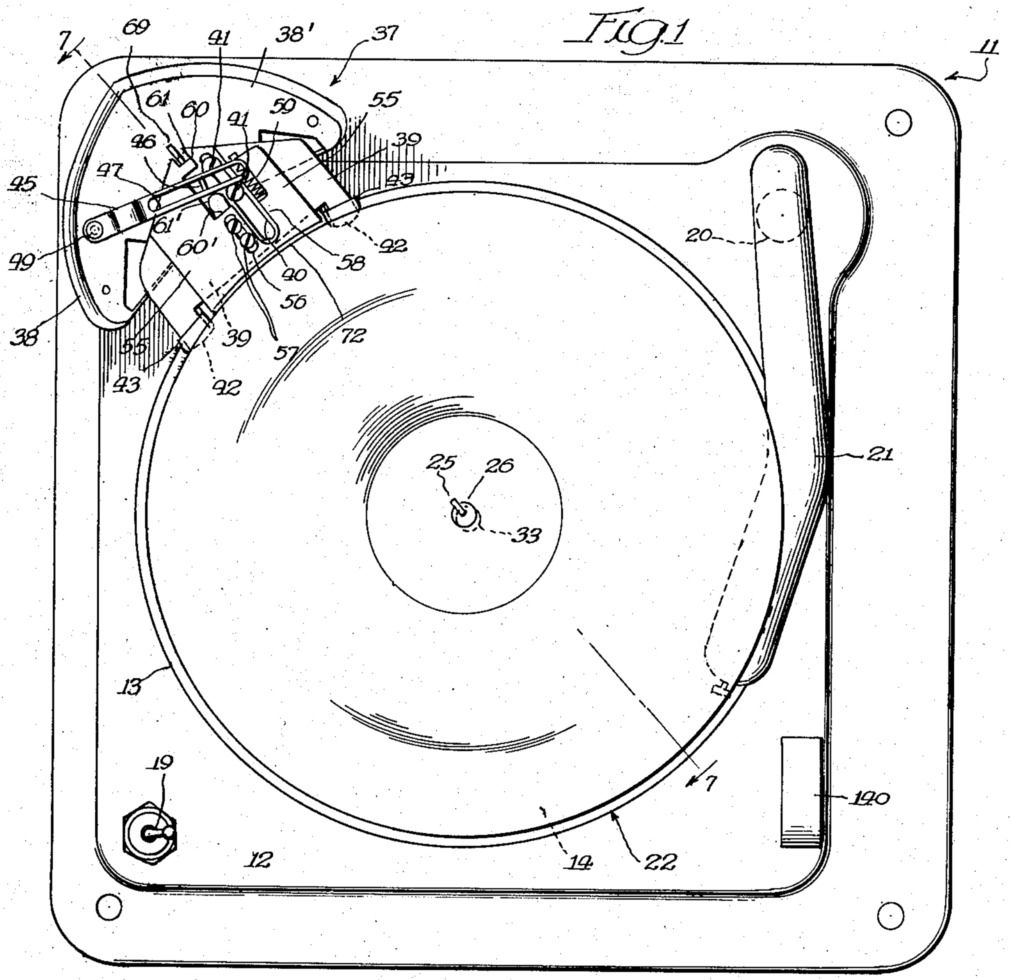
Fig. 1 is a top plan view of a phonographic record player embodying the present invention.
Figure 6:
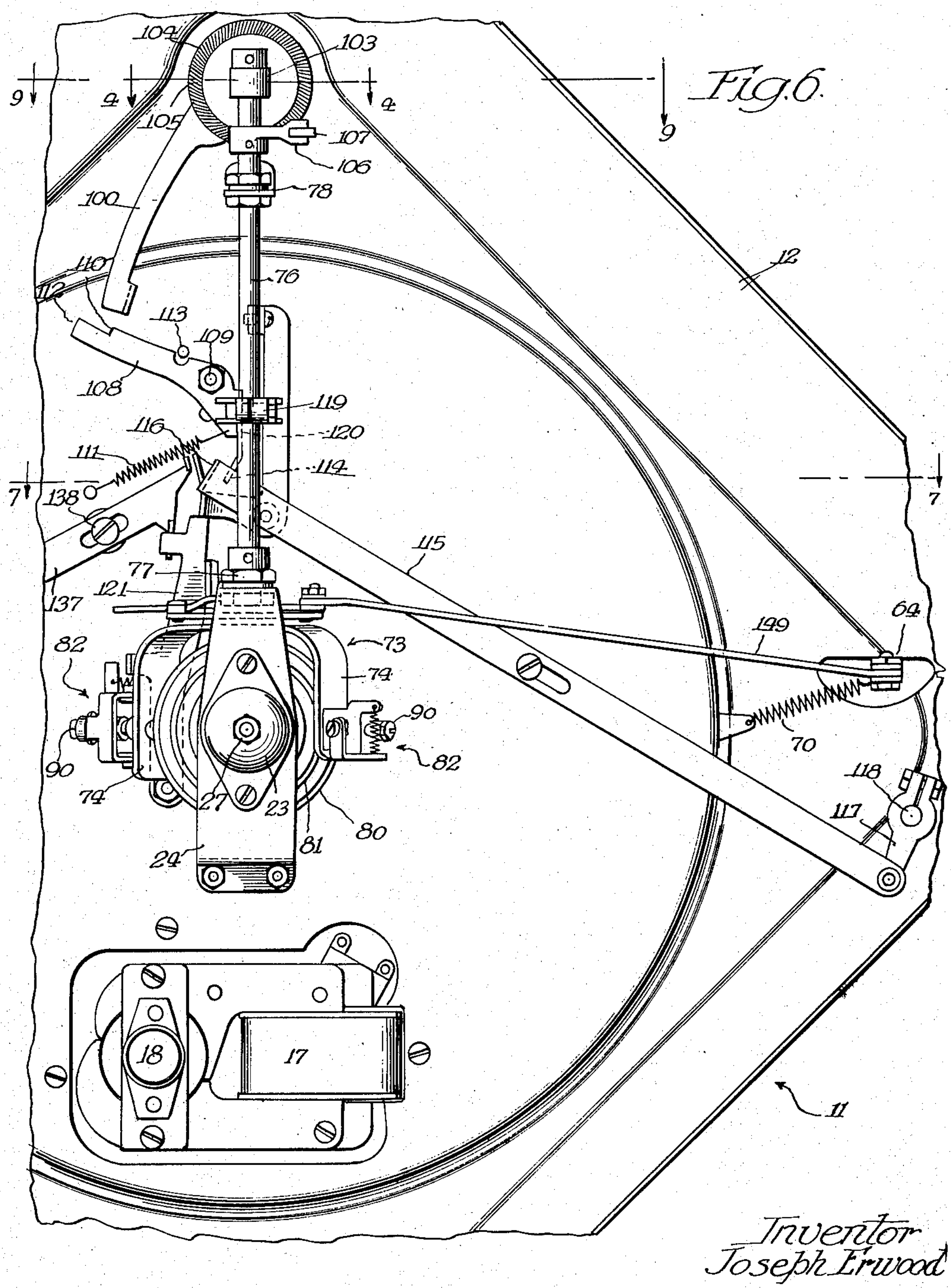
Figures 7, 8:
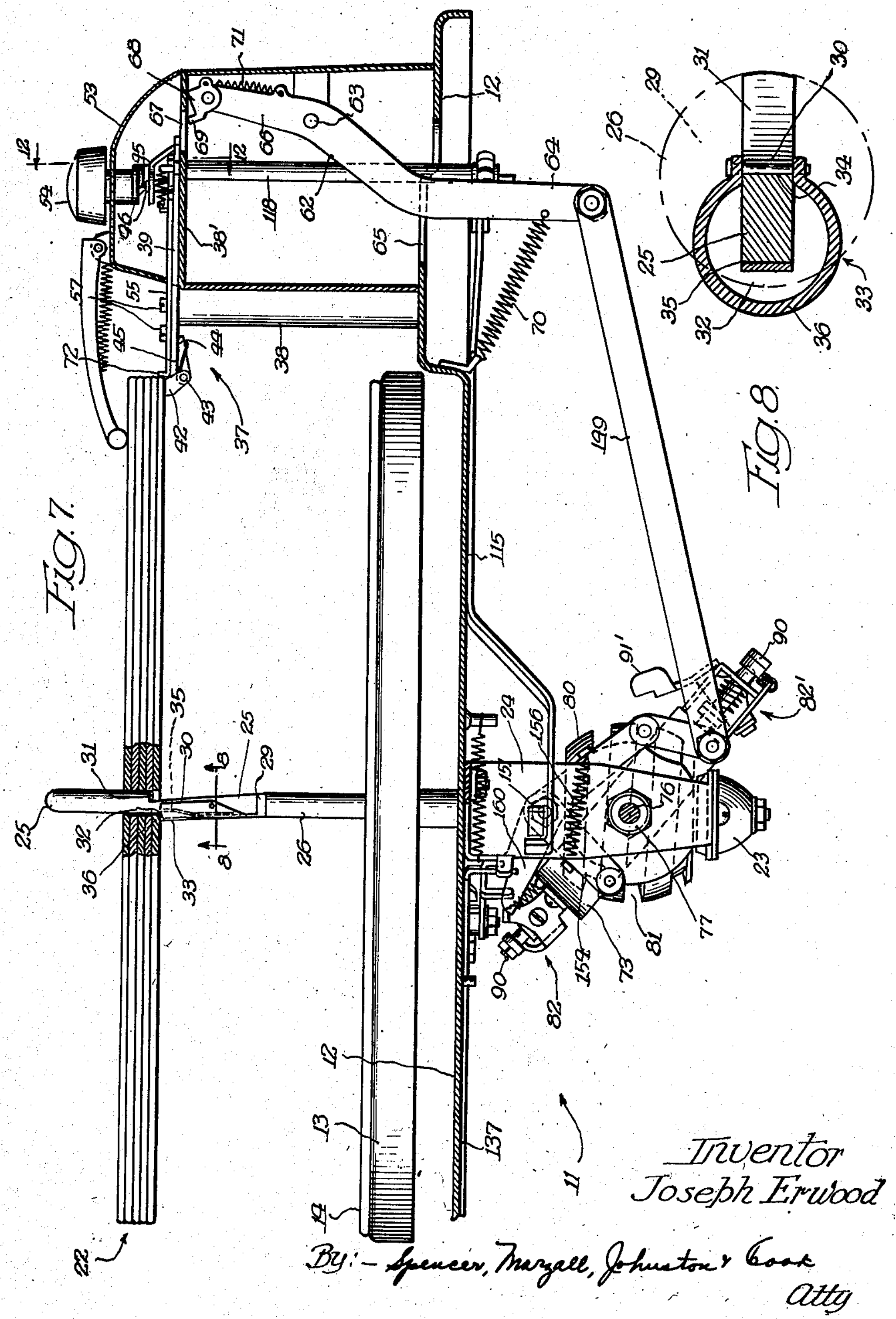

Fig. 6 is a view of the under side of the apparatus shown in Figs. 1, 2 and 3.

Figures 9, 10:
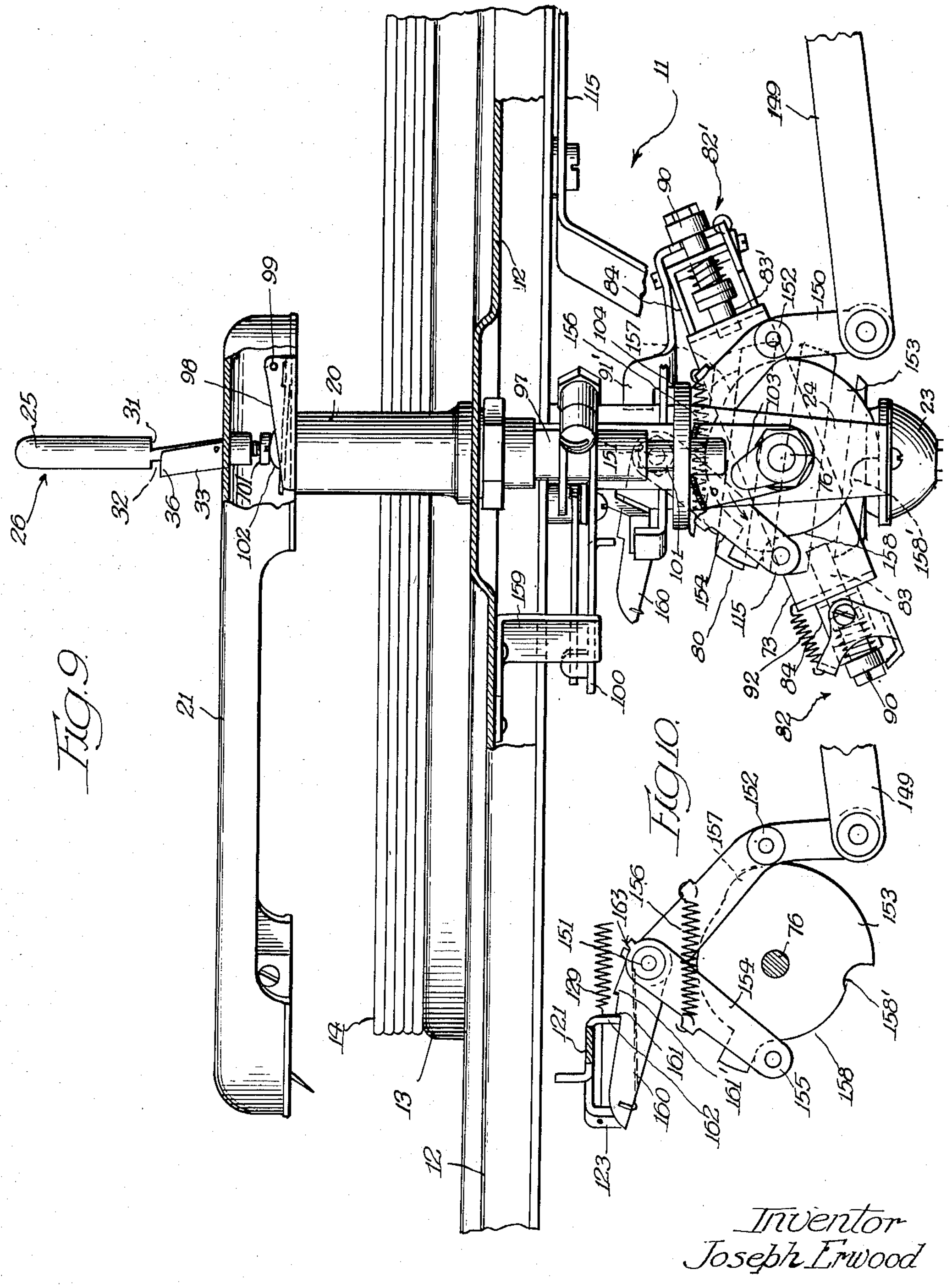
Figures 11, 12:
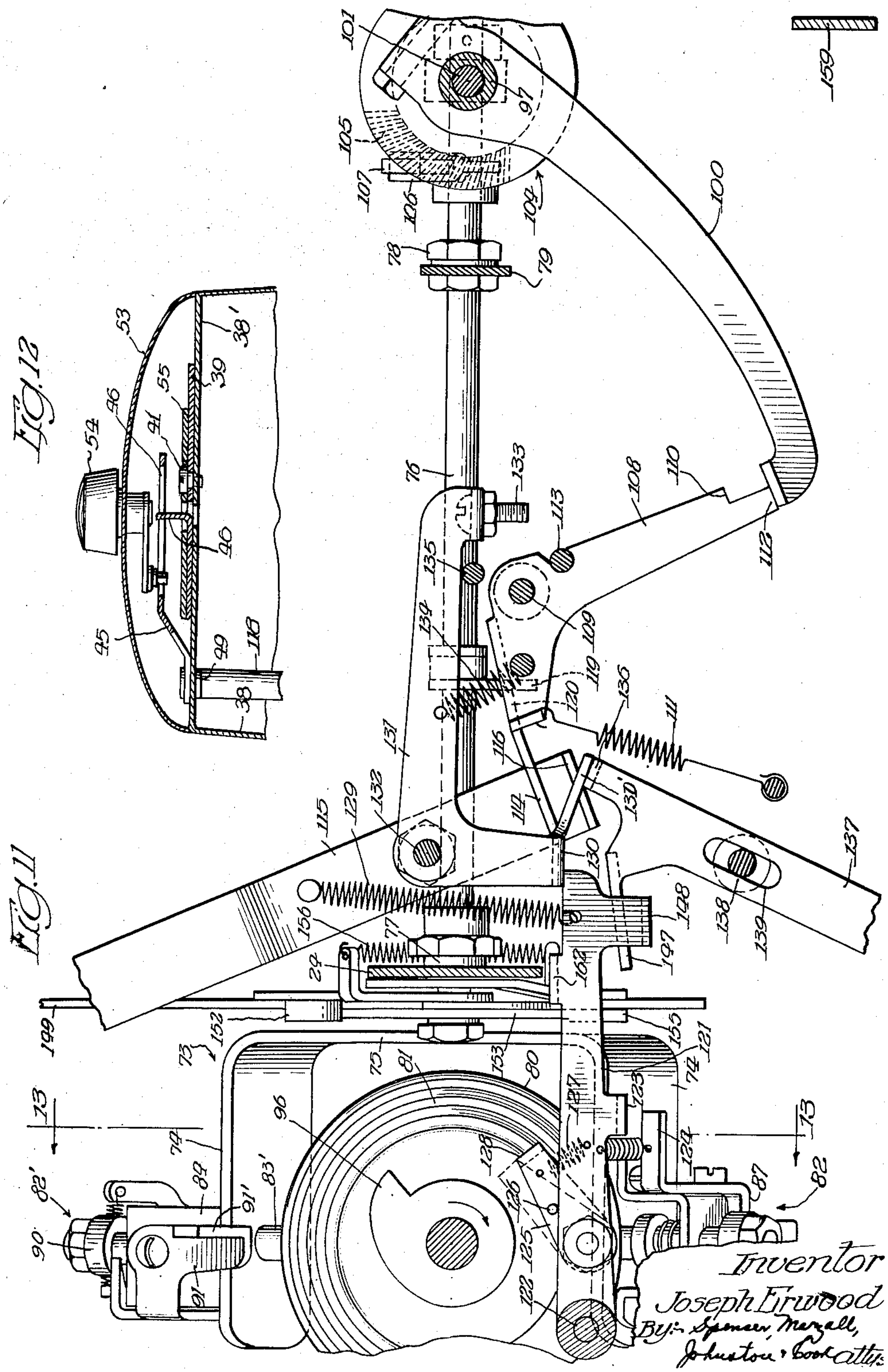

Figs. 7, 8, 9, 11, 12, 13 and 14 are sectional views of the apparatus taken, respectively, along the lines 7—7, 8—8, 9—9, 11—11, 12—12, 13—13, and 14—14, in Figs. 3, 6, 7, and 13; and Fig. 10 is a fragmentary view of portions of the mechanism illustrated in Fig. 9.

To illustrate the invention the drawings show a record player 11, comprising a support plate 12 carrying a record turntable 13 adapted to support a record 14 in playing position thereon. The turntable is mounted for rotation on the support plate 12, as in suitable bearing means 15, the turntable preferably having a centrally disposed sleeve member 16 extending through the bearing 15.

The turntable may be, and preferably is, driven by an electric motor 17, in any suitable or preferred fashion. As shown, the motor may be secured upon the plate 12, on the under side thereof, and may have a shaft 18 extending through the plate 12 and carrying a turntable driving wheel in position to drivingly engage a downwardly turned marginal rim on the turntable. Operation of the motor may be controlled by a suitable switch 19, preferably mounted on the plate 12, the switch having its manually operable member exposed above the plate and being electrically connected, beneath the plate, in a suitable electric motor energizing circuit.

The plate 12, outwardly of the turntable, may be provided with a pedestal 20 on which a pick-up device comprising an arm 21 is pivoted for swinging movement about the vertical axis of the pedestal. The arm is also mounted for movement about a horizontal axis at the top of the pedestal, so that a pick-up device at the swinging end of the arm may engage and may be raised from engagement with a record in playing position on the turntable. The pick-up device on the arm 21 may be connected with any suitable sound reproducing apparatus, so that by applying the pick-up device to a record on the turntable and by operating the motor 17, the apparatus may reproduce the sounds recorded on the record.

The present invention contemplates the provision of mechanism for the automatic delivery of records in playing position on the turntable. Such mechanism, as shown, may comprise magazine means for carrying a stack of records 22 in position to be delivered successively into playing position upon the turntable, the delivery mechanism including means operable for ejecting records successively from the stack onto the turntable. To this end the turntable support sleeve 16, which extends through the bearing 15, is turnably mounted at its lower end in a bearing 23, which in turn is supported on a mounting bracket 24, of generally U-shaped configuration, carried on and extending beneath the plate 12. A record stack supporting center pin 26 extends within the sleeve 16, which is freely turnable about said center pin. The lower end of the center pin may be secured as by means of a fastening nut 27 to a mounting member 28 on the bracket 24, at and in line with the lower end of the sleeve member 16, said mounting member 28 forming a casing for the bearing 23. The center pin 26 is thus held against turning movement while the turntable is rotated about the axis of the pin.

The pin 26 extends upwardly of the turntable and has upper portions 25, above a shoulder 29, formed to rectangular sectional configuration. This portion of rectangular sectional configuration is cut away as at 30 to form a downwardly facing shoulder 31 on one side of the pin. The pin portion 25, on the side thereof opposite from the cut away portion 30, may also be cut away to form a recess 32′ terminated by a downwardly facing shoulder 32. The pin also carries a channel shaped lever 33, having side portions embracing the pin portion 25, above the shoulder 29, and pivotally secured to said portions as by means of a pin 34. A leaf spring 35 may be enclosed within and carried by the member 33, in position to bear upon the pin portions 25, in the recess 32′, to normally urge the member 33 on its pivot in a direction to project the upper end of the member 33 normally outwardly of the shoulder 32 to form an upwardly facing ledge or shoulder 36, the member 33 being depressible against the urge of the spring 35 to bring the shoulder 36 into facing alignment with the shoulder 32. When in such position, the member 33 extends within the cut out portion or recess 32′ forming the shoulder 32, and provides in effect a continuation of the cylindrical portions of the center pin. It should be noted that the downwardly facing shoulder 31 and the upwardly facing shoulder 36 are spaced apart a distance slightly greater than the thickness of a record 14.

The foregoing arrangement of the center pin allows it to function as a means for supporting the record stack 22, the records of the stack being carried in concentric alignment with the upper end of the center pin extending through the aligned center openings of the records. The records, of course, may be applied to the center pin by inserting their aligned center openings over the upper, preferably rounded, end of the pin, and the records will be supported by the upwardly facing shoulder 36, underlying the lowermost record of the stack at the central opening thereof. It will be noted that all of the records in the stack, thus supported, with the exception of the lowermost record, are positively held in concentric alignment by the upper portions of the center pin. Since the downwardly facing shoulder 31 of the center pin is spaced above the upwardly facing shoulder 36 a distance slightly greater than the thickness of a record, the lowermost record in the stack may be moved on the center pin in a direction to align its central opening with the hollow lever 33. When so moved, the lowermost record will be free to fall, under the influence of gravity, in a downward path, guided by the center pin, and thus be deposited as a record 14 in position to be played on the turntable.

In order to thus move the lowermost record in the stack 22, to release or eject it from the stack and deposit it in playing position on the turntable, edge pushing mechanism 37 may be provided. This pushing mechanism may comprise a suitable, preferably sheet metal, frame forming a pedestal 38 on the support plate 12, outwardly of the edge of the turntable. The top 38′ of the pedestal preferably forms a slideway on which a plate member 39 is mounted for adjustable sliding movement in a direction radially of the record stack 22. To this end, the plate 39 may be formed with a slot 40, and the pedestal may carry a pair of guide projections, which may conveniently comprise set screws 41, for securing the plate 39 on the pedestal and guiding its adjustable movement thereon. The plate 39, at its stack facing edge, may be provided with a pair of lugs or ears 42, in position to underlie the edge of the lowermost record in the stack 22, and thereby support the stack substantially horizontally on the shoulder 36 of the center pin and on the lugs 42, the plate 39 being cut back, as shown more particularly in Fig. 1, intermediate the lugs. Accordingly, by projecting the plate to a predetermined position of adjustment on the pedestal 38, the supporting lugs may be positioned to support a stack of records of small size such as standard ten-inch phonograph records. By retracting the plate 39 to another adjusted position, the lugs 42 may be adjusted for the support of a record stack of larger records, such as standard twelve-inch records. In this connection the slot 40 and members 41 may be sized and arranged to limit the adjustable movement of the plate 39 for the accommodation of standard ten-inch and twelve-inch records, or other cooperating stop means may be provided for determining the desired adjusted positions of the plate 39 on the pedestal 38.

In order to accomplish the adjusting movement of the plate 39, it may be provided with an upstanding lug or finger 46, and this finger may be received slidably in a slot 47 formed in an actuating lever 48 pivoted as at 49 on the pedestal 38. A crank pin 50, extending in the slot 47, preferably at the end thereof remote from the pivot 49, may be employed to actuate the lever 45 for the adjustment of the plate 39. To this end the crank pin 50 may be mounted on a crank arm 51, said arm being fixed on an operating shaft 52. The shaft 52, in turn, may be journaled in a suitable bearing formed in a cover member 53 adapted for removable attachment on top of the pedestal 38, said cover serving to enclose the edge supporting and pushing mechanism on the pedestal. The shaft 52 may extend upwardly of the cover, and may be provided with an operating knob 54.

As shown, the lugs 42 may comprise sheet metal members pivotally supported on the plate 39 as by means of pivot pins 43; and the members 42 may be provided with extensions 44 adapted to engage the under side of the plate 39 in order to support the lugs 42 in stack supporting position on the plate 39. Spring means 45 may also be provided to normally urge the lugs 42 on the plate toward stack supporting position. This arrangement, however, will allow the lugs 42 to rotate on the plate 39 upwardly, that is to say, in a clockwise direction viewing Fig. 7, against the spring means 45. This arrangement, in conjunction with the depressible center pin member 33, facilitates the removal of a record or records from the turntable by merely lifting the same upwardly on the center pin. As records are moved upwardly from playing position on the turntable, the member 33 will be depressed on the center pin, thereby allowing the records being removed to clear the shoulder 34, and the lugs 42 likewise will rotate upwardly to allow the edges of the records, being removed, to freely pass the edge supporting device.

A pusher plate 55 is mounted on and carried by the adjustable plate 39, said pusher plate being relatively movable on the plate 39 in a direction radially of the record stack 22. To this end the plate 55 may be formed with an elongated slot 56, and the plate 39 may carry a pair of ears, preferably comprising set screws 57, in position extending in the slot to guide the sliding movement of the plate 55 on the plate 39. The plate 55 also may be formed with a cut out slot 58 in position to register with the slot 40, the slot 58 being sufficiently large to clear the heads of the set screws 41 to avoid interference thereof with the plate 55. The plate 55 is normally urged toward a retracted position on and with respect to the plate 39, as by means of a retracting spring 59, having its opposite ends connected on lugs formed on the plates 39 and 55, respectively.

The plate 55 also has a pair of actuating shoulders 60 and 60′ formed therein, and the underlying plate 39 is cut away as at 61 and 61′ opposite said shoulders 60 and 60′. An actuating lever 62 extends within the pedestal 38. This lever is pivotally mounted as on a pin 63, and has an end 64 extending beneath the plate 12, through a slot 65 therein. The other end 66 of the lever 62 is disposed adjacent and immediately beneath the plate 38′, which forms the pedestal portion carrying the plates 39 and 55. This plate 38′ is formed with a slot 67, in position registering with the shoulder 60 of the plate 55 when said plate and the plate 39 are in projected position for accommodating records of relatively small size. The slot 67 is likewise in position to register with the shoulder 60′ when the plates 39 and 55 are in retracted position for the accommodation of records of large size. The lever end 66 carries a pusher finger member 68 pivotally mounted thereon, said pusher finger member having a finger portion 69 in position to extend through the slot 67 and pushingly engage one or the other of the shoulders 60′ of the plate 55, when the lever 62 is moved on its pivot 63 in a clockwise direction viewing Fig. 7. The lever 62 is normally held in retracted position as by means of a spring 70. When in such retracted position, the member 69, because of the engagement of the finger portion 69 with the end of the slot 67, will likewise be in retracted position against the influence of a projecting spring 71. By moving the lever 64 on its pivot 63 against the influence of the spring 70, its end 66 will be advanced toward the plate moving shoulders 60 and 60′. Simultaneously, the member 68 will be released for movement under the influence of the spring 71, to project the pushing finger portion 69 through the slot 67 into position to engage whichever one of the shoulders 60 or 60′ is in adjusted position at the slot 67. The member 68 also has a stop portion adapted to cooperatively engage with its carrying lever 62 when the member 68 is in a position of maximum projection, whereby continued movement of the lever 62, against the influence of its spring 70, will cause the finger 69 to press upon the shoulder 60 or 60′, as the case may be, and advance the plate 55 on the plate 39 in a direction radially of the record stack 22. The plate 55 has a pushing edge which may be defined by an upstanding flange 72, said pushing edge extending between the record edge supporting lugs 42. Accordingly, when the plate 55 is moved as a result of the operation of the lever 62, the pushing edge 72 will engage and press upon the edge of the lowermost record in the stack 22, and will thereby move said record to align the central opening thereof with the support member 33 of the center pin, to thereby release such lowermost record from the stack and allow it to drop into playing position on the turntable 13.

Simplified driving mechanism is provided in order to operate the record feeding mechanism and to correlate the operation thereof with record playing movements of the pick-up arm 21. This driving mechanism operates automatically for record changing purposes by first lifting the arm 21 from a record being played, and swinging it to a retracted or stand-by position outwardly of the record. Performing its operating cycle, the record feeding mechanism then actuates the record feeding lever 62 to deposit the lowermost record in the stack 22, in playing position, on the turntable. Finally, the mechanism advances the arm 21 radially inwardly with respect to the turntable, and deposits it upon the record in position to commence the playing thereof.

To these ends the actuating mechanism comprises a movable frame 73 supported on the underside of the plate 12, said movable frame preferably comprising a U-shaped member supported for pivotal movement about an axis extending at an angle with respect to the axis of turning movement of the turntable, said axes preferably extending in a common plane and being disposed preferably at right angles the one with respect to the other. As shown, the preferably U-shaped frame 73 has a pair of spaced arms 74, disposed on opposite sides of the sleeve portion 16 of the turntable, the frame 73 having a medial portion 75 interconnecting the arms 74 and fastened at its midpoint on a shaft 76, which extends through and is journaled in bearing means 77, in one of the legs of the bracket 24. The shaft 76 extends beneath the pedestal 20, on which the pick-up arm 21 is mounted, and is also journaled in a bearing 78 carried by a bracket 79 supported on the plate 12.

The frame 73 thus comprises an operating member periodically movable under the driving influence of the motor 17 to turn the shaft 76. The shaft 76, in turn, is cooperatively associated with the pick-up arm 21 through means extending within the pedestal 20 and operable to raise, swing, and lower the pick-up arm in accordance with movements of the shaft 76.

In order to drivingly rock the frame 73, the sleeve member 16, which forms a part of the turntable and hence is driven by the motor 17, is provided with a driving cam member 80 which is formed with a helical cam groove 81, and the arms 74 of the bracket are provided each with clutch means 82 and 82′ adapted normally to remain inactive, but operable in succession to drivingly cooperate with the cam groove 81 in order to rock the frame on its pivot through substantially 90° to a projected frame position through the operation of one of the clutch devices, and then, through the operation of the other clutch device, to return the frame to its normal or stand-by position. Operating means drivingly connected with the frame 73 is provided for operation during movement of the frame from stand-by to projected position, to raise the pick-up arm 21 from playing position on a record, and to swing the arm to its retracted or stand-by position outwardly of the turntable. Means is also provided for actuating the record feeding mechanism as the frame 73 approaches its position of maximum projection. Means, operable during the retraction of the frame from projected to stand-by position, is provided for swinging the pick-up arm 21 to a starting position at the edge of the record and for lowering the arm into playing position on the record.

As shown, the cam member 80 comprises a substantially spherical member which may conveniently be formed of mouldable material. The cam member is secured on the sleeve 16 in any suitable fashion, as by moulding it directly upon the sleeve. The helical cam groove 81 is formed on the surfaces of the member 80 in position to engage and drivingly receive driving pins 83, 83′, the same comprising operating parts of the clutch means 82 and 82′.

The driving pins 83 and 83′ have cam engaging ends extending through and guided in openings formed in the bracket arms 74. Each arm 74 carries a bracket member 84, which conveniently may comprise a sheet metal strip bent to U-form, with the arms of each strip attached to the bracket arms 74 on which it is mounted. The pins 83, 83′ have portions extending through openings in the medial portions of the strips 84 whereby said pins are slidably supported on the bracket arms 74 and on the medial portions of the bracket strips 84. The pins 83, 83′ are provided each with a peripheral shoulder 85 and are normally urged as by means of springs 86 in a direction to project the inner ends of the pins toward the cam member 80, which is disposed between the bracket arms 74. The pins 83, 83′ are thus normally urged into position to engage the ends thereof in the cam groove 81. Such movement of the pins is limited by the engagement of the shoulder portions 85 with the bracket arms 74. If desired, washers of resilient material 85′ may be applied to the pins in position extending between the bracket arms 74 and the shoulder portions 85 to eliminate any clicking noise which might otherwise occur upon engagement of the shoulder portions 85 with the bracket arms 74, when the pins are suddenly moved to projected cam engaging position. The springs 86, conveniently, may be applied in position encircling the pins 83, 83′, and bearing, at the opposite ends of the springs, upon the shoulder portions 85 and the medial portions of the bracket strips 84.

The pins 83, 83′ are normally retained in retracted position on the bracket by means of latches 87, said latches preferably comprising sheet metal members pivotally supported on pins 88 carried by the brackets 84. These latches 87 have pin holding prongs 89 adapted to engage beneath heads 90, on the pins, to hold the pins in retracted position against the influence of the springs 86. The latch members 87 each have an actuating arm 91, and a spring 92 is connected between each arm 91 and the bracket 73 to normally urge the members 87 toward pin latching position. By moving the arms 91 against the influence of the springs 92, the members 87 may be moved each to release its latched pin for movement from retracted latched position into driving engagement in the cam groove 81.

Figures 13, 14:
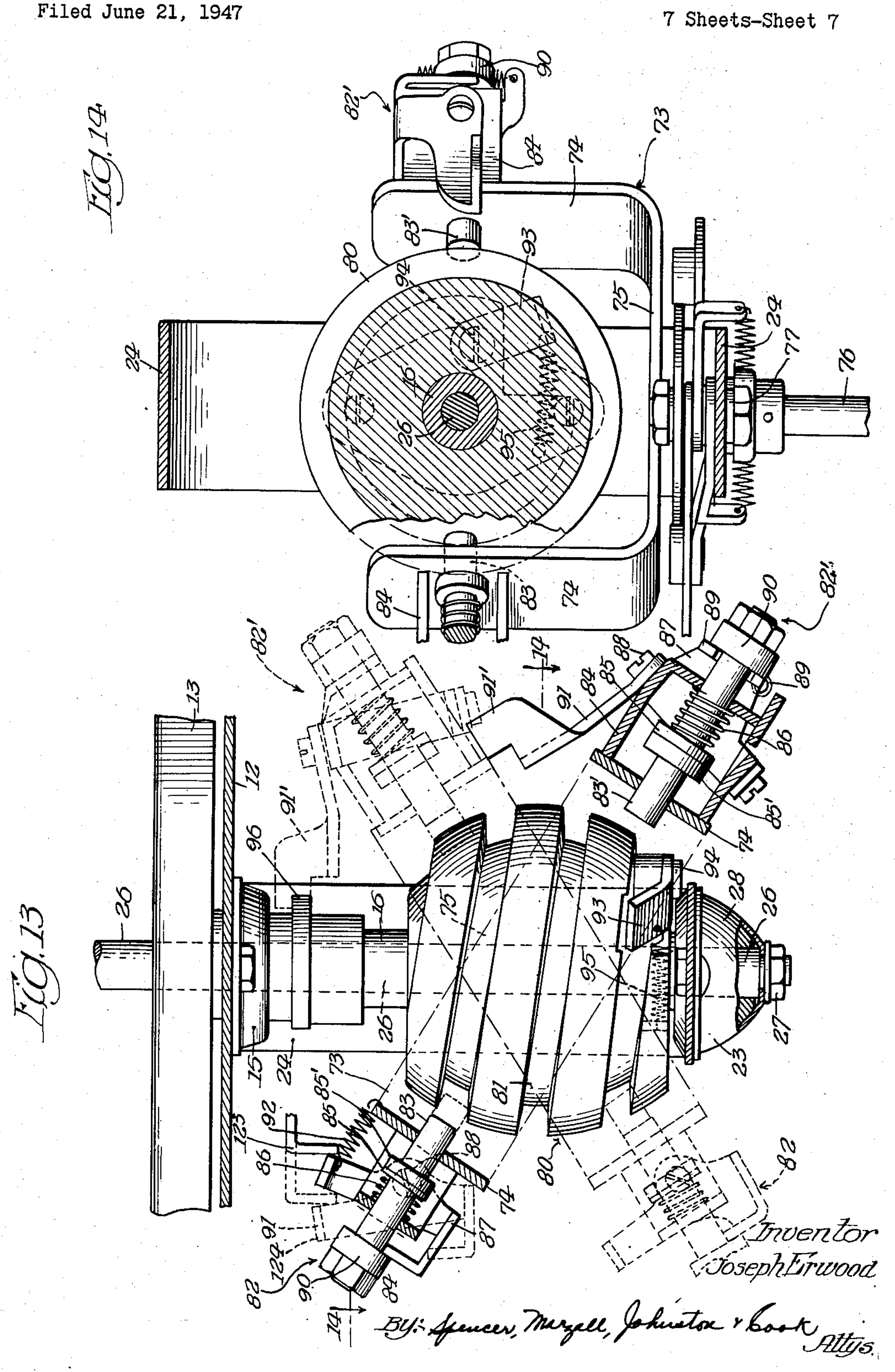

By thus releasing the latch member 87 of the driving device 82, the pin 83 may be projected into engagement with the groove 81 of the cam device, at one end of said groove, thereby causing the frame 73 to move from its stand-by position, shown in solid lines in Fig. 13, to a projected position shown in dotted lines in said figure, movement of the frame being caused by the driving action of the helical cam on the bracket carried pin 83, the cam being continuously driven by the motor 17, through the turntable 13. When the bracket 73 reaches its projected position, the pin 83 engages a relatching lever 93, on the cam member 80, at the end of the groove 81. Any suitable or preferred resetting means may, of course, be employed, as, for example, by forming the bottom of the groove 81 at its end with an outward inclination for engaging and projecting the end of the pin 83 in a direction radially outwardly of the axis of rotation of the member 80, whereby to relatch the pin 83. As shown, however, the relatching cam 93 comprises a preferably sheet metal strip pivotally mounted as on a pin 94 on the member 80, said strip having an end extending in the end of the groove 81; and said strip is normally urged as by means of a spring 95 into position to engage the end of the pin 83 as it reaches the end of the groove 81. Upon engagement of the pin 83 with the member 93, said member may swing on its pivot 94 against the influence of the spring 95 to project said end in a direction radially outwardly of the axis of rotation of the member 80, and thereby aid in moving the pin 83 to its relatched position, in which it will thereafter be secured by the associated latch member 87.

When the frame 73 reaches its projected position, shown in dotted lines in Fig. 10, the driving cam mechanism 82′, with pin in retracted position, will extend adjacent the cam carrying sleeve 16. The arm 91 of the latch member of the mechanism 82′ is provided with an extension 91′ comprising a lug adapted to extend adjacent the cam carrying sleeve 16 in position to be engaged by a tripping finger 96 on said sleeve 16 so that the continuous rotation of said sleeve, driven by the motor 17, will move the arm 91 to unlatch the pin 83′ as soon as the frame 73 reaches its projected position in which the tripping finger 96 may engage the lug 91′. Thereupon, the pin 83′ will be projected into position to engage in the cam groove 81, thus forming a driving connection through which the cam member 80 may return the frame 73 to its initial or starting or stand-by position, shown in solid lines in Fig. 13, the relatching cam 93 operating to relatch the pin 83′, when said pin 83′ reaches the end of the groove 81, such relatching action of the pin 83′ being accomplished in exactly the same fashion as the relatching of the pin 83.

It will be seen from the foregoing that, after the latch 91 of the driving mechanism 82 has been operated to release the pin 83, the projection of the frame 73 from stand-by position, to projected position, and the return thereof to stand-by position, will be accomplished automatically by the operation of the relatching cam means 93 and of the latch tripping finger 96. Accordingly, the projecting and retracting movement of the frame 73 and of the shaft 76 may be and is utilized to lift and return the pick-up arm 21 to its retracted position clear of the turntable, then to actuate the record feeding mechanism during projecting movement of the frame 73, and finally to swing and deposit the pick-up arm in playing position on the delivered record and to release the same for playing movement upon the record, during the return movement of the frame 73 from projected to retracted or stand-by position.

To this end the support pedestal 20 forms a vertical bearing for an arm supporting tube 97, which is turnable within the pedestal 20. One end of this tube 97 extends at the upper end of the pedestal and carries a bracket 98 upon which the arm 21 is pivotally supported as by means of a horizontal pivot pin 99. The tube 97 has an end extending outwardly of the pedestal beneath the support plate 12, said end carrying an arm or blade 100 extending radially outwardly of the tube and turnable therewith. Vertically movable within the bore of the tube 97, and having splined driving connection therewith, is a pin 101 having an end projecting upwardly of the pedestal 20 in position to engage a bearing block 102 on the arm 21. By moving the pin 101 up or down through the sleeve 97 and pedestal 20, the arm 21 may be raised or lowered on its pivot pin 99. By turning the pin 101 on its axis, the arm 21 may be swung horizontally about the axis of the pin, through the splined connection of the pin with the sleeve 97 and the connection of said sleeve through the bracket 98 with the arm 21. Means is provided for thus raising and lowering the arm 21, by axial movement of the pin 101, and for swinging the arm in response to the projecting and retracting movement of the frame 73 during its operating cycle following the release of the clutch mechanism 82.

To this end the frame connected shaft 76 extends beneath the end of the pin 101 and is provided with a pin lifting cam 103, comprising a collar formed with a radially extending pin lifting finger, positioned on the shaft 76 to elevate the pin during the initial period of shaft movement when the frame 73 is projected from stand-by position. Operation of the lifting cam 103, thus, will lift the pick-up device from engagement with the record immediately after the mechanism 82 is operated at the conclusion of the playing of a record.

In order to swing the arm 21 to retracted position, the pin 101 carries an arm swinging disc 104 having a roughened or serrated marginal edge 105 on its under side, and the shaft 76 carries a driving segment 106 having a driving edge 107 preferably formed of friction material, such as leather, for engagement with the roughened edge portions 105. This driving segment is so positioned on the shaft as to commence its driving engagement with the disc 104, as the result of turning movement of the shaft, as soon as the pin 101 has been lifted to raise the arm 21 from engagement with a record on the turntable. The segment is also formed to continue its driving movement with the disc 104 sufficiently to swing the arm 21 to stand-by position, clear of the edge of the turntable, as the result of movement of the frame 73 to the fully projected position shown in dotted lines in Fig. 13. After operation of the record feeding mechanism during the terminal interval of projecting movement of the frame 73, the segment 106, during return movement of the frame 73 to stand-by position, is operable to swing the arm 21 radially inwardly of the turntable until the arm reaches a predetermined starting position for record playing purposes.

In order to stop the arm in starting position at the edge of a record, in playing position on the turntable, a stop latch 108 is provided in position to engage the arm 100 as the same swings inwardly with the arm 21. This stop latch 108 preferably comprises a sheet metal member pivotally mounted for swinging movement on a pin 109 which is fastened on and extends beneath the plate 12. Where standard ten-inch or twelve-inch records are to be accommodated, the latch member 108 may be provided with a pair of stop shoulders 110 and 112. Spring means 111 is provided and connected between the member 108 and a spring anchoring pin on the support plate 12 for normally urging the latch member 108 in a direction to present the shoulders 110 and 112 in the path of swinging movement of the arm 100. A stop pin 133 may be mounted, on the support plate 12, in position to engage and limit the movement of the member 108 in one direction, to thereby normally present the member 108 with its shoulder 112 in position to engage the arm 100. Accordingly, the arm 100 will engage and, with the pick-up arm, will be stopped by said shoulder 112 when the pick-up arm 21 is in position to start playing, say, a twelve-inch record on the turntable. The member 108 has a finger 114, by means of which it may be adjustably shifted from its normal position, determined by the pin 113, into shifted position, presenting the shoulder 110 for stopping engagement with the arm 100. An adjusting member 115, preferably comprising a sheet metal strip, mounted on the support plate 12 for shifting movement longitudinally of the strip 115, is provided for so shifting the member 108. To this end, the member 115 is provided with a lug 116 for engaging the finger 114, the member 115 being also connected with a lever arm 117 carried on a shaft 118, which is turnably supported on the plate 12 and which extends therethrough and within the pedestal 38 of the record feeding mechanism. This shaft 118 is drivingly connected with the adjusting lever 45, and turns therewith as the same is moved in adjusting the feeding mechanism 37 to records of various sizes. Accordingly, when the feeding mechanism is adjusted to a large size twelve-inch record, the member 115 will be in position releasing the member 108 so that it may occupy its normal position determined by the pin 113 to present the shoulder 112 for stopping engagement with the arm 100. When the adjusting lever 45, however, is in position setting the feed mechanism for smaller ten-inch records, the member 115 will have been shifted into position engaging the lug 116 with the finger 114, to thereby move the arm 108, against the influence of its spring, into position presenting the shoulder 110 for engagement with the arm 100. Accordingly, depending upon the adjusted position of the feeding device, the arm 100 may be stopped by the member 108 in position to start the playing, on the turntable, of a record of the size to which the feeding mechanism is adjusted.

After the arm 100 has engaged a shoulder of the member 108, the friction driving segment 106 may slip with respect to the disc 104 as the shaft 76, driven by the frame 73, continues to rotate during the returning movement of said frame toward its stand-by position. The shaft 76 also carries an arm 119, fast thereon, which extends in position to engage a release lug 120 on the member 108, to retract the same against the influence of the spring 111 and withdraw the stop shoulders from engagement with the arm 100, as the frame 73 reaches stand-by position, whereby to release the arm 21 for free playing movement above the record. The arm 119 and the lifting cam 103 are oriented on the shaft 76 so that movement of the cam 103, with the shaft 76, as the frame 73 reaches its retracted or stand-by position, will result in lowering the stem 101, to thus engage the pick-up device, on the arm 21, with the record contemporaneously with the release of the stop latch 108 from the arm 101, by engagement of the arm 119 with the retracting lug 120.

In order to release the driving pin 83 of the clutch mechanism 82, in order to initiate the driving cycle of the frame 73 and connected mechanism, a release lever 121, for releasing the latch 87 of the clutch mechanism 82, is provided. This lever 121 may be pivoted on a pin 122, carried by the support plate 12, and may be formed with a lug 123 in position to engage a finger portion 124 on the actuating arm 91 of the latch 87, to thus release the latch of the mechanism 82 and allow the pin 83 to enter the cam groove 81.

The lever 121 has an arm 125 pivoted thereon and provided with a stop pin 126 in position to engage an edge of the lever 121 and limit the turning movement of the arm 125 thereon in one direction. Spring means 127 is provided between the arm 125 and the lever 121 to normally urge the arm yieldingly in such direction. The lever 121 also is normally urged on its pivot 122 in a direction to retract the lug 123 from the finger 124, and to present the end of the arm 125, which is provided with an actuating finger 128, into the path of the cam finger 96 on the sleeve 16, which supports the cam member 80 and is adapted to be driven continuously by the motor 17 while the record playing and feeding apparatus is in operation. To this end, a spring 129 may be connected between the lever 121 and an anchor pin on the plate 12.

The lever 121 is normally held in an inoperative or stand-by position by means of a lug 130 on a trip lever 131, which is pivotally mounted on a pin 132 carried by the plate 12. This lever 131 has an arm provided at its end with an adjustable set screw 133. The arm supports the set screw in position to be engaged by the end of the arm 100 when the pick-up arm 21 is in position at the conclusion of the playing of a record on the turntable. The arm 131 is normally urged as by means of a spring 134, in a direction to engage the lug 130 with the lever 121, to hold said lever in its inactive position, movement of the lever 131 under the influence of the spring 134 being limited by a stop pin 135 on the plate 12.

The set screw 133 may, of course, be adjusted to cause engagement of the arm 100 with the lever 131, when the arm 21 reaches a predetermined distance from the center pin 26, during the playing of a record. The arm 131, thus, may be moved by the arm 100 in a counterclockwise direction viewing Fig. 11, against the influence of the spring 134 to disengage the lug 130 from the lever 121, thereby allowing the lever 121 to swing on its pivot 122 under the influence of the spring 129 into position presenting the lug 128 of the arm 125 into the path of turning movement of the finger 96. When the lever 121 is in its inoperative position, held by the lug 130, the finger 128 is disposed radially outwardly of the path of the finger 96, but after release of the lever 121, engagement of the finger 96 with the finger 128 will thereafter move the lever 121 on its pivot 122 in a clockwise direction viewing Fig. 11, into position wherein the lug 123 engages with the finger 124 to thereby release the latch 87 of the clutch device 82. During this latch releasing movement of the lever 121, the arm 125 may pivot on the lever 121, the spring 127 yielding to permit such pivoting movement, whereby to maintain driving engagement between the fingers 96 and 128. In this fashion, the lever 121 may be moved through a substantial angle of displacement, the arm 125 having an action akin to that of a toggle. After the lever 121 has thus been moved to extended latch tripping position, the nose of the finger 96 may turn itself on the finger 128 whereby the finger 128 may ride down the inclined trailing surface of the finger 96 as the same continues its rotation; and the finger 128 will be released, and may snap back to retracted position on the lever 121 under the influence of the spring 127, thereby allowing the lever 121 to return to normal position under the influence of the spring 129.

The lever 131 is also formed with an extension 130', the same conveniently comprising an extension of the lug 130. Said extension 130' may be disposed in position to be engaged by a lug 136 on a bar 137, slidingly secured on the support plate 12 as by means of a headed pin 138 on the plate 12, and an elongated slot 139 formed in the bar. This bar extends beneath the plate 12 to a position outwardly of the turntable, and may be fastened to a manually operable knob 140 mounted for sliding movement on the plate 12 in position accessible from above the plate. A latching member 141, having adjacent notches 142 and 143, may be connected with the manually operable knob 140, in position extending preferably beneath the plate 12, said latching member 141 being cooperatively associated with a latching spring 144. The latching spring preferably comprises a leaf spring supported at one end on the plate 12 and having a free end extending adjacent the member 141. Near its free end, the spring is bent to provide a latching rib 145 and an adjacent inclined spring extension 146. The knob 140 may be shifted in one direction, as downwardly viewing Fig. 1, to engage the notch 142 with the rib 145. When latched in such position, a lug 147 on the bar 137 will be disposed in position engaging a lug 148 on the lever 121 to thereby prevent movement of the lever, under the influence of the spring 129, into position allowing engagement of the finger 128 with the finger 96. Accordingly, when the manual control knob is so positioned, the lever 121 will be locked against operation to unlatch the clutch member 82, and the apparatus will be conditioned for so-called manual operation by inhibiting the automatic operation of the record feeding apparatus.

By moving the knob 140 to position the notch 143 in engagement with the rib 145 and the spring extension 146, the bar 137 will be moved to release the locking finger 147 from the finger 148, and the mechanism will be conditioned for normal automatic operation. If at any time during the playing of a record, as when it is desired to reject an unwanted record by feeding a successive record immediately to the turntable, the knob 140 may be moved, as in an upward direction viewing Fig. 1, against the yielding resistance of the spring extension 146, operating against a side of the notch 143. Such movement of the knob 140 and connected bar 137 will cause the finger 136 to engage with the extension 130′, thereby turning the lever 131 on its pivot 132, against the influence of the spring 134, to disengage the lug 130 from the lever 121 and thus release the same for operation to release the latch of the clutch mechanism 82. Thereupon, the mechanism will operate to lift and retract the pick-up device from the record being played, to feed a new record disc from the stack 22 onto the turntable, and to replace the pick-up device in start playing position on the new record disc.

The actuating lever 62 of the record feeding mechanism is actuated by a connecting rod 149, connected between the end 64 of the lever 62, and the end of a lever 150 which is pivoted for turning movement on a support pin 151, on an arm of the bracket 24. The lever 150 carries a cam following roller 152, adapted to ride upon the edge of a cam disc 153, which is secured to the frame 73. The pivot pin 151 also carries a lever arm 154, provided with a cam following roller 155, the levers 150 and 154 being disposed in position extending on opposite sides of the cam disc 153, so that the rollers 152 and 155 may ride on opposite sides of the disc. Spring means 156 is connected between the levers 150 and 154, in order to yieldingly draw the same together to maintain the rollers 152 and 155 in engagement with the opposite sides of the cam disc. The cam disc is formed as at 157 to project the roller 152 outwardly of the axis of rotation of the cam disc, to thereby swing the lever 150 on its pivot 151 to move the connecting rod 149 and the lever 62 sufficiently to accomplish the feeding of a record disc through the action of the edge pushing member 55; and this may be accomplished by properly locating the cam portion 157 to cause the feeding of a record disc, as the frame 73 approaches its position of maximum projection during its cycle of operating movement.

The roller 155 operates in a cut out portion 158 of the cam disc, and its carrying arm 154 serves to limit the operating movement of the disc and frame 73, and as an anchorage for the spring 156. The arm 154 also serves yieldingly to latch the frame 73 and connected operating elements in retracted or stand-by position. To this end, the cut out portion 158 of the cam disc 153 may be formed with a latching notch or cavity 158′ in position to receive the roller 155 when the frame 73 is in stand-by position. It will be seen, also, that the arm 154 is moved through a small angular displacement, in a clockwise direction, viewing Fig. 10, as the roller 155 leaves the latching cavity 158′ when the frame 73 is projected from stand-by position; and the arm will remain in such displaced position, with the roller 155 supported on the cam portion 158, until the frame 73 returns to stand-by position at the conclusion of its operating cycle. This action of the arm 154 is utilized to lock the latch release lever 121 in an inactive position, after it has been actuated by the finger 96 to release the latch of the clutch 82, and thus prevent the lever 121 from being repeatedly actuated by the finger 96 during the interval before the holding member 131 becomes restored to position to control the lever 121. To this end, a lever locking member 160 may be pivoted on the pin 151, adjacent the lever 154. The member 160 may be provided with a locking shoulder 161 and may be normally spring urged, in a clockwise direction in Fig. 10, into position to engage a lug 162 on the lever 121. Interengaging means 163 on the lever 154 and member 160 serve to limit the clockwise movement of the member 160 and may also operate to retract the latter when the roller 155 enters the cavity 158′. Accordingly, as soon as the latch of the clutch 82 has been released by the action of the lever 121, driven by the finger 96, the arm 154 will be projected to present the locking member 160 to engage the lever 121 on the shoulder 161 and prevent it from being projected by its spring 129 into position to be again actuated by the finger 96; and the lever 121 will remain so locked by the member 160 until said member is retracted from lever locking position by the lever 154 when the roller 155 enters the cavity 158′ as the frame 73 returns to stand-by position at the conclusion of its operating cycle. At such time the lever will be released for operation under the control of the lever 131. The member 160 may also be provided with a shoulder 161′ in position to engage the lug 162 of the lever 121, upon release of said lever by the tripping lever 131 to initiate the operating cycle of the mechanism. When the lever 121 is released by the tripping lever 130, the shoulder 161′ serves to hold the lever 121 in exact position with respect to the path of the actuating finger 96 so that said finger may engage the toggle member 126 for the actuation of the lever 121.

It will be seen from the foregoing that the mechanism affords relatively simple and inexpensive record playing apparatus, in that substantially all of the parts may comprise sheet metal stampings, while the cam member 81 may be inexpensively produced as a moulded element or a turned element produced on automatic machinery. Exceedingly simple control means is provided for conditioning the apparatus either for manual or automatic operation; and the mechanism provides means manually operable at any time, during the playing of a record, to discontinue and reject such record and deliver a succeeding record from the stack.

The apparatus operates automatically at the conclusion of the playing of a record by engagement of the arm 100 with the actuating lever 131, movement of which, by the lever 100, releases the lever 121 for movement into position to be actuated by the continuously turning finger cam 96, said cam serving to project the lever 121 into position releasing the latch 87 of the clutch device 82. Upon release of the clutch device, its pin 83 drivingly engages the groove 81 of the driving cam 80 and turns the frame 74 from stand-by to projected position. During such movement of the frame 74, the arm 119 first releases the stop latch 108, which moves to a normal position depending upon the size of the records in the stack 22. Upon further movement of the frame 73, the cam 103 raises the stem 101 and lifts the pick-up arm 21 from the record disc. Continued movement of the frame 73 immediately thereafter engages the segment 107 with the disc 104, and swings the pick-up arm outwardly of the turntable to a stand-by position determined by engagement of the arm 100 with a stop member 159 on the plate 12. As the arm 21 is thus swung to its retracted or stand-by position, the cam portion 157 actuates the feeding mechanism 37 to deposit a record, from the stack 22, in playing position on the turntable.

When the frame 73 reaches the limit of its projecting movement, the pin 83 engages the relatching lever 93, and is relatched out of driving engagement with the cam groove 81. At the same time the releasing finger 91' of the clutch device 82' is disposed in position to be actuated by the releasing member 96. Thereupon, the driving pin 83' of the clutch member 82' is projected into engagement with the cam groove 81, to return the frame 73 from projected to stand-by position.

During the return movement of the frame 73, the segment 106 first moves the pick-up arm 21 from its retracted position into position to commence the playing of the record on the turntable, as determined by the engagement of the arm 100 with one or the other of the shoulders 110 and 112 of the stop lever 108, the segment slipping on the disc 104 after the arm 100 becomes engaged by one of said stop shoulders, to permit continued movement of the driving segment 106 with the shaft 76. Immediately thereafter the cam 103 releases the pin 101 and allows the pick-up arm to drop into playing engagement with the record; and the arm 119 simultaneously engages and retracts the lever 108 to release it from stopping engagement with the arm 100. Thereafter, the pin 83', having returned the frame 73 to its stand-by or retracted position, engages the relatching lever 93 and is thereby returned to latched position retracted from the driving cam 80.

It should be noted that the lever 131, after having been actuated to release the lever 121 for clutch unlatching purposes, either by record rejecting movement of the bar 137, or by the arm 100 at the conclusion of the playing of a record, will immediately return to its normal position determined by the spring 134 and pin 135, as soon as the bar 137 shall have been released, or as soon as the arm 100 shall have been swung away from the lever 131 by the operation of the during segment 106. Accordingly, after operation of the lever 121, for latch releasing purposes, it will be held in locked position by the member 160 controlled by the arm 154 and cam means 158 and 158'. The lever 12' is released by the member 160, at the conclusion of the operating cycle of the frame 73, and may then return to its normal inoperative position held by the lug 130 of the lever 131.

It will be seen from the foregoing that the devices of the present invention afford exceedingly simple yet positively acting intermittently operating mechanism which may have general purpose application but which is especially well suited for initiating and controlling the automatic performance of a phonographic record disc changing cycle. Inexpensive means, comprising the three-position control knob 140, is provided for locking the mechanism against operation, for adjusting it for automatic operation and for manually initiating its operating cycle. As applied in phonographic record disc playing equipment, this control knob provides for record rejection at any time and for the control of the mechanism for automatic or manual operation. The employment of the release member 96 for actuating the latch means of the clutch 82' and also to operate the latch releasing lever 121, affords an exceedingly simple and inexpensive, yet positive, means for controlling the operation of the clutch devices 82 and 82'. The employment of a driving cam 153, of inexpensive construction, and the utilization of a shaft 76 for accomplishing the swinging of the pick-up arm and the actuation of the record disc feeding mechanism in timed relation, affords an exceedingly simple and inexpensive construction whereby the necessary operations are accomplished positively in the required sequence.

The mechanism also affords exceedingly satisfactory, yet inexpensive, means for conditioning the same for the accommodation of records of various size, by the correlation of the stop member 115 with the manually shiftable lever 45, the operation of which is necessary to adjust the record feeding mechanism to the size of the records being played.

An important feature of the invention is the rapidity with which the record changing operation is effected, and the relatively low cost of mechanism required.

No claim is made per se for the novel center pin construction illustrated and described herein, since the same forms the subject matter of invention set forth in the co-pending application of Harold C. Lawin, Serial No. 756,152, filed of even date herewith, now Patent No. 2,536,190, issued January 2, 1951.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Intermittently operable mechanism, comprising a cam member having spherical sides formed with a helical cam shoulder, means to drive said cam member about a rotational axis, an actuating member rockable about an axis normal to and lying in a common plane with said rotational axis, said actuating member having portions disposed on opposite sides of said cam member and carrying clutch members projectable into driving engagement with said helical shoulder whereby to rock said actuating member on its axis.

2. Intermittently operable mechanism comprising a driven cam member mounted for rotation about its axis and having substantially spherical side surfaces formed with a helical driving shoulder thereon, said shoulder having a leading end and a trailing end, a rockable actuating member comprising a shaft and a shaft connected driving bracket having arms extending on opposite sides of said cam member, in position to rock in spaced relation with respect to the spherical side surfaces thereof, a clutch comprising a driving pin on each of said arms, means normally urging said pins on said arms into position drivingly engaging said helical shoulder, latch means for holding said pins retracted on said arms, in position disengaged from said shoulder, yieldable latch means for holding said rockable actuating member in retracted stand-by position, means to release the latch means of one of said pins for driving engagement with said shoulder, at the leading end thereof, whereby to rock said actuating member in one direction, from retracted stand-by position to projected position, by movement of the pin along said shoulder from its leading to its trailing end, means operable to release the latch means of said other pin for driving engagement with said shoulder, at its leading end, when said rockable actuating member reaches its projected position, whereby to return the same to retracted stand-by position by movement of the pin along the shoulder from its leading to its trailing end, and a pin relatching cam in position to engage said driving pins, as they reach the trailing end of said shoulder, to disengage them from the shoulder and relatch them in retracted position on said arms.

JOSEPH ERWOOD.

REFERENCES CITED

The following references are of record in the file of this patent:

UNITED STATES PATENTS

| Number | Name | Date |
|---|---|---|
| 1,655,081 | Adams | Jan. 3, 1928 |
| 1,738,512 | Andrews | Dec. 10, 1929 |
| 2,271,001 | Fortune | Jan. 27, 1942 |
| 2,328,641 | Glaser | Sept. 7, 1943 |
| 2,339,981 | Cranmer et al. | Jan. 25, 1944 |
| 2,343,992 | Morrison | Mar. 14, 1944 |
| 2,352,331 | Leline | June 27, 1944 |
| 2,366,858 | Knox et al. | Jan. 9, 1945 |
| 2,370,875 | Pressley | Mar. 6, 1945 |
| 2,376,741 | Weaver | May 22, 1945 |
| 2,394,539 | Erwood et al. | Feb. 12, 1946 |
| 2,490,678 | Dale | Dec. 6, 1949 |

FOREIGN PATENTS

| Number | Country | Date |
|---|---|---|
| 106,995 | Sweden | Mar. 30, 1943 |
| 241,703 | Switzerland | Aug. 16, 1946 |